July 4, 1933.  E. L. ROSE  1,916,491
RECTILINEAR INDUCTION MOTOR
Filed May 27, 1931
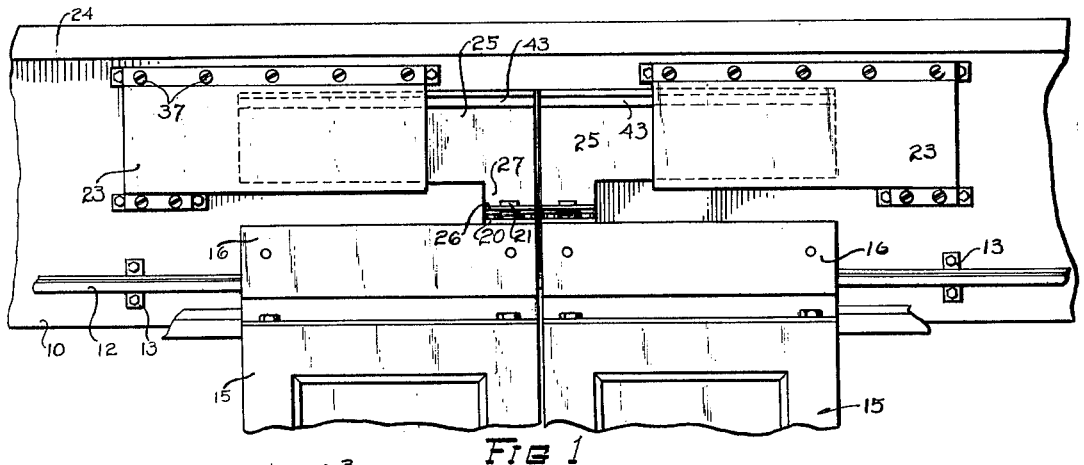
Fig. 1
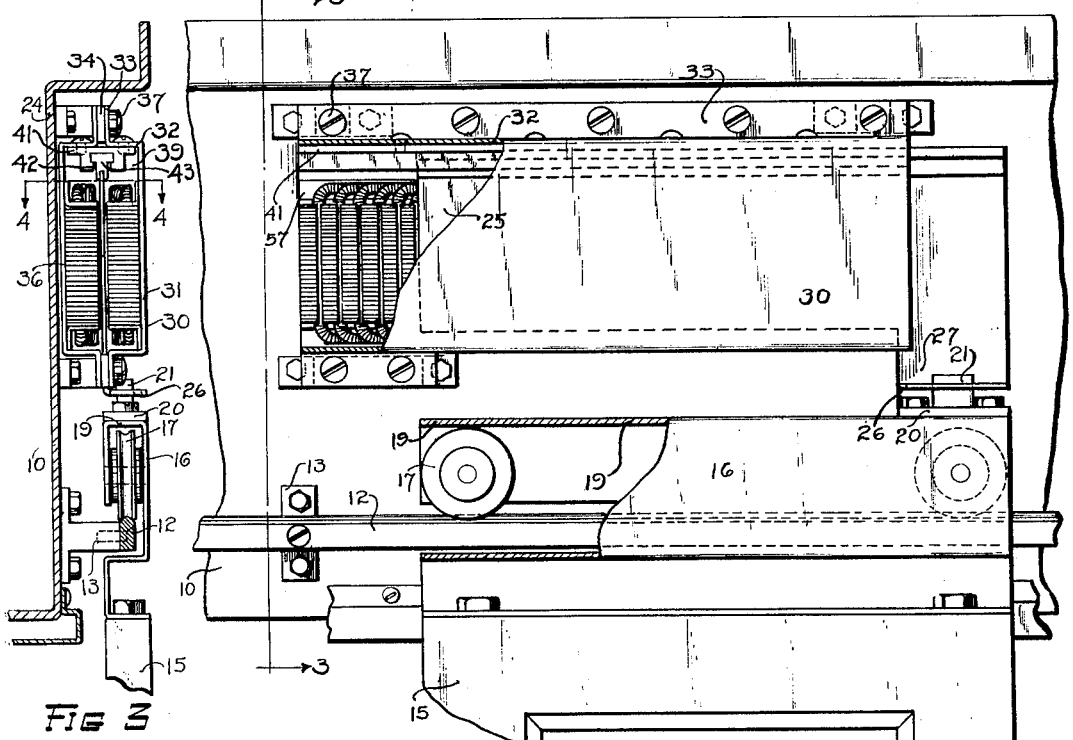
Fig. 3
Fig. 2
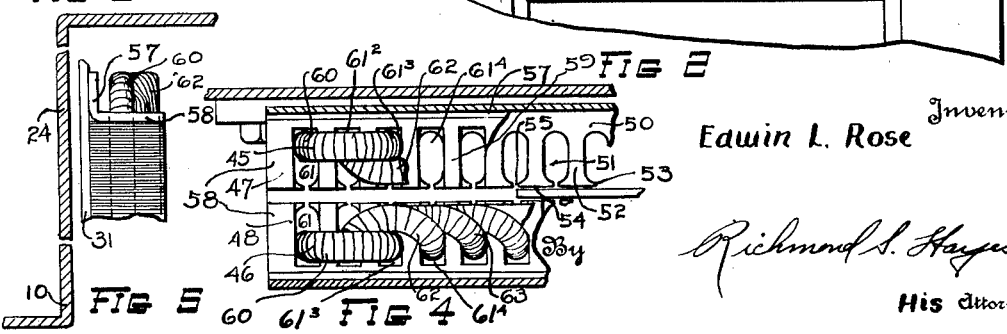
Fig. 5  Fig. 4
Edwin L. Rose, Inventor
by Richmond S. Hayes, His Attorney Patented July 4, 1933

1,916,491

UNITED STATES PATENT OFFICE

EDWIN L. ROSE, OF CAMBRIDGE, MASSACHUSETTS, ASSIGNOR TO DAHLSTROM METALLIC DOOR COMPANY, OF JAMESTOWN, NEW YORK, A CORPORATION OF NEW YORK

RECTILINEAR INDUCTION MOTOR

Application filed May 27, 1931. Serial No. 540,359.

This invention relates to an improvement in a rectilinear induction motor and more particularly one adapted to produce translating motion.

The preferred embodiment of this invention discloses an induction motor comprised of a stationary field structure and movable armature. Energizing the field structure from a suitable source of polyphase current supply, sets up a traveling magnetic field which, by reason of the reaction of said field, with a magnetic field induced in the armature causes translation of said armature.

The principal object of the invention is to provide an induction motor capable of producing translating motion.

Another object of the invention is to provide a rectilinear induction motor having a multi-polar polyphase winding.

Other and further objects of the invention may be more clearly understood from a consideration of the following specification, taken in conjunction with the accompanying drawing, which disclose one application of the motor, and in which Fig. 1 is a rear elevation of one modification of this invention shown applied to and adapted to actuate sliding enclosure doors;

Fig. 2 is an enlarged fragmentary elevation of one of the motors shown in Figure 1, parts being broken away to disclose details of the invention;

Fig. 3 is a vertical sectional view taken substantially on the line 3—3 of Figure 2, showing the motor arrangement with relation to a sliding door;

Fig. 4 is an enlarged fragmentary plan view of the motor, showing the coil and lamination arrangement; and Fig. 5 is an enlarged fragmentary end view, showing a part of the field structure of the motor.

Referring to the drawing the invention, for the purpose of illustration, is shown mounted upon an entrance enclosure and adapted to actuate a sliding door.

An enclosure generally indicated by the reference numeral 10 is fitted with a suitable track 12, supported upon brackets 13. One or more doors 15 are mounted on the track 12, being supported through pendent plates 16 and rollers 17. On the horizontal flange 19 of the plate 16 is a bracket 20, having an upwardly projecting lug 21. This lug constitutes engaging means for the motor armature.

The translating motor comprises a field structure 23, mounted on the vertical wall 24 of the enclosure, and an armature 25 which is connected with the door 15. The lug 21 of the bracket 20 projects through a horizontal flange 26 which terminates the depending portion 27 of the armature.

The field structure 23 is comprised of reversely disposed duplicate windings mounted in a casing 30. This casing is formed by oppositely arranged channel members 31 which terminate in flanges 33 formed at right angles to the side walls 32. The channels 31 are disposed with flanges 33 adjacent each other but, since the depth of each winding is substantially that of each channel, spacer blocks 34 are provided between said flanges for the purpose of creating a vertical passage 36 in which the armature is located. It will be noted that the lower flanges 33 do not extend the full length of the casing 30, the purpose of which is to permit travel of the depending portion 27 of the armature beneath and substantially the full length of the field structure. Channels 31, when joined together by bolts or screws 37 passing through the flanges 33, produce a rectangular compartment 39 which is open at both ends.

Secured jointly to the upper side walls 32 of the channels 31 is an armature guide and support 41. This guide has a full length recess 42, substantially T-shaped in cross-section, which is adapted to receive and support a shoe 43 fixed to the upper edge of the armature and which constitutes the means by which said armature is supported.

The field structure 23 is arranged with oppositely disposed parallel groups of coils 45 and 46. The coils of each group are mounted on flat laminated cores 47 and 48, which consist of stamped strips 50, piled one on top of the other to any desired core height. These strips contain evenly spaced substantially oval shaped slots 51 formed by similarly spaced projections 52. The projections diverge at their ends to form skirts 53, the edges of which constitute pole faces 54. Horizontally adjacent pole faces are separated by a narrow slot 55 which is connected with the oval slot 51. To insure proper stacking of the laminations, angle plates 57 abut the top and bottom strips of the core. A horizontal flange 58 is formed with spaced rectangular projections 59 corresponding in number and length to the projections of the strips 50 (see Figure 4). The width of the projections is preferably slightly less than that of the strip projections 52, in order that the slots 31 may present uniformly sized openings in which to mount the coils.

Referring particularly to Figure 4 and considering only half of the motor which comprises coil group 46 and core 48, coil 60, adjacent the end of the core, is mounted with one edge occupying core slot 61. The other edge of this coil is mounted in slot $61^3$, leaving slot $61^2$ unoccupied by said coil. The next adjacent coil 62 is mounted with one edge lying in slot $61^2$ and the other edge in slot $61^4$. One edge of coil 63 occupies slot $61^3$ with the adjacent edge of coil 60, the slots being of a size to receive two coil edges. This arrangement of the coils is continued throughout the length of one coil group to the other end of the core, where the end slot will be occupied by the edge of the last coil only. The other half of the motor is reversely disposed relative to that portion just described and, comprising identical elements, will not be further discussed.

The rectilinear induction motor described above is adapted to operate on two-phase alternating current. The coil groups are connected together and with a source of current supply. Energizing the coils results in a traveling field of two adjacent coils in length per pole. Since the field structure is comprised of a plurality of such coils, it is obvious that a series of traveling field poles is set up throughout its length. The magnetic field poles produced by the coils induce eddy currents in the armature which in turn produce magnetic fields that react with the fields set up by currents in the coils. Since the induced voltage in the armature is 90 degrees out of phase with the current in the coils producing said armature current, the maximum magnetic field of the armature is located slightly behind the pole faces of maximum field intensity. The resultant force of reaction between the moving field and the armature currents moves the armature in one direction relative to the field structure. To reverse the direction of travel of the armature relative to the stator, the connections of two-phases to the current supply may be interchanged.

While applicant has shown and described but one modification of his invention, it is obvious that other modifications or adaptations may be made without departing from the spirit and scope of the invention as set forth in the hereunto annexed claims.

Having thus set forth my invention what I claim as new and for which I desire protection by Letters Patent is:

1. A rectilinear induction motor including a field structure comprising a casing and a stator, walls defining a longitudinal opening in said casing, said stator including a pair of duplicate spaced apart core elements, means in said casing supporting said core elements, walls defining slots in said core elements, coils mounted in said slots, a guide mounted in said casing and vertically aligned with said opening, a shoe, said shoe being engaged with and supported by said guide, an armature secured to and depending from said shoe, said armature being movable in one direction or the other when said coils are suitably energized from a two-phase source of current supply.

2. A rectilinear induction motor including a field structure comprising a casing enclosing a stator, a pair of duplicate spaced apart core elements secured to opposite walls of said casing, coils mounted in said core elements, the adjacent core faces defining a vertical passageway, a guide mounted above and in alignment with said passageway, means engaged with and supported by said guide, an armature, said means being secured to and supporting said armature for linear translation when said coils are suitably energized from a two-phase source of current supply.

3. A rectilinear induction motor having a casing, walls defining a longitudinal opening in said casing, core elements mounted in said opening, walls defining slots in said elements, coils mounted in said slots, the adjacent core faces defining a vertical passageway, an armature in said passageway, a shoe secured to one edge of said armature, and means engaged with said shoe and supporting said armature in said opening whereby, when said coils are suitably energized from a two-phase source of current supply, said armature is translated relative to said casing.

4. In a rectilinear induction motor, a casing comprising reversely disposed channels, a core element mounted in and secured to each of said channels, walls defining slots in each of said core elements, coils mounted in said slots, means spacedly joining said channels to produce a vertical passageway between adjacent core faces, an armature located in and spaced from the core faces forming said passageway, further means supporting said armature in said passageway, said further means serving to guide said armature for linear motion relative to said casing when said coils are suitably energized from a two-phase source of current supply.

5. A rectilinear induction motor having a field structure and an armature, a casing enclosing and supporting said field structure, said casing being mounted on and secured to a suitable fixed member, said armature being joined to a movable member and projecting into said field structure, an armature guide secured to said casing, said guide including a walled recess extending longitudinally of and in vertical alignment with an armature receiving opening in said field structure, means on said armature projecting into said recess, said means cooperating with said guide to support said armature in said opening for linear motion relative to said field structure.

6. A rectilinear induction motor having a field structure and an armature, a casing enclosing and supporting said field structure, said casing being mounted on and secured to a suitable fixed member, said armature being joined to a movable member and projecting into said field structure, an armature guide secured to said casing, said guide including a walled recess extending longitudinally of and in vertical alignment with an armature receiving opening in said field structure, a shoe secured to the upper edge of said armature, said shoe, when said armature is located in said opening, being mounted in and engaged with the walls of said recess and cooperating with said guide to support said armature in spaced relation with the walls of said armature opening in said field structure.

In testimony whereof I have affixed my signature.

EDWIN L. ROSE.